United States Patent [19]

Orlowski

[11] Patent Number: 5,158,304
[45] Date of Patent: Oct. 27, 1992

[54] CAPTURED ROTOR SEAL

[75] Inventor: David C. Orlowski, Milan, Ill.

[73] Assignee: Inpro Companies, Inc., Rock Island, Ill.

[21] Appl. No.: 468,765

[22] Filed: Jan. 23, 1990

[51] Int. Cl.⁵ ............................................ F16J 15/447
[52] U.S. Cl. ........................................ 277/53; 277/25; 277/67; 277/133; 277/134
[58] Field of Search .................. 277/13, 14 R, 14 V, 277/21, 25, 53, 67, 68, 71, 95, 96.1, 133, 134, 135, 1, 54-56, 69, 193, 199; 384/132, 135, 144, 465, 478, 480

[56] References Cited

U.S. PATENT DOCUMENTS

| | | | |
|---|---|---|---|
| 1,659,450 | 2/1928 | Stromeier | 277/67 |
| 1,748,972 | 3/1930 | Buckwalter | 277/67 X |
| 2,133,230 | 10/1938 | Sanders | 277/67 |
| 2,149,712 | 3/1939 | Wallgren | 277/67 X |
| 2,281,905 | 5/1942 | Young | 277/56 |
| 3,791,657 | 2/1974 | Bilski | 277/53 |
| 4,022,479 | 5/1977 | Orlowski | 277/53 |
| 4,103,907 | 8/1978 | Inouye et al. | 277/96.1 |
| 4,114,902 | 9/1978 | Orlowski | 277/53 |
| 4,175,752 | 11/1979 | Orlowski | 277/53 |
| 4,466,620 | 8/1984 | Orlowski | 277/53 |
| 4,560,172 | 12/1985 | Zimmermann et al. | 277/14 R X |
| 4,572,517 | 2/1986 | Rockwood | 277/53 |
| 4,576,383 | 3/1986 | Ballard | 277/53 |
| 4,630,458 | 12/1986 | Kakabaker | 384/48 X X |
| 4,685,684 | 8/1987 | Ballard | 277/53 X |
| 4,706,968 | 11/1987 | Orlowski | 277/53 |
| 4,743,034 | 5/1988 | Kakabaker et al. | 277/53 |
| 4,817,966 | 4/1989 | Borowski | 277/25 X |
| 4,832,350 | 5/1989 | Orlowski | 277/53 |
| 4,852,890 | 8/1989 | Borowski | 277/25 |
| 4,865,469 | 9/1989 | Haas et al. | 384/480 X |
| 4,881,829 | 11/1989 | Koelsch | 277/53 X |
| 4,890,941 | 1/1990 | Calafell, II et al. | 277/53 X |
| 4,902,197 | 2/1990 | Rhodes et al. | 277/13 X |

FOREIGN PATENT DOCUMENTS 817432 7/1959 United Kingdom ................. 277/67

Primary Examiner—William A. Cuchlinski, Jr.
Assistant Examiner—Scott W. Cummings
Attorney, Agent, or Firm—Zarley, McKee, Thomte, Voorhees & Sease

[57] ABSTRACT

An improved seal is provided to minimize or eliminate lubricant migration and welling problems on electric motors, gear boxes, and lubricant contamination in rolling mills. The improved seal includes a stator ring fixed in the housing and a rotor ring sealingly mounted on the shaft for rotation therewith. A second, captured, rotor is provided within the stator ring and is sealingly mounted upon the shaft for rotation therewith. The captured rotor includes a plurality of radially extending slots which impart increased energy to migrating and welling lubricant so as to force the lubricant into a communicating annular groove within the stator, which in turn is in communication with a return trough which directs the energized lubricant back into the housing or, in the case of rolling mills, of contamination back to the exterior.

22 Claims, 2 Drawing Sheets

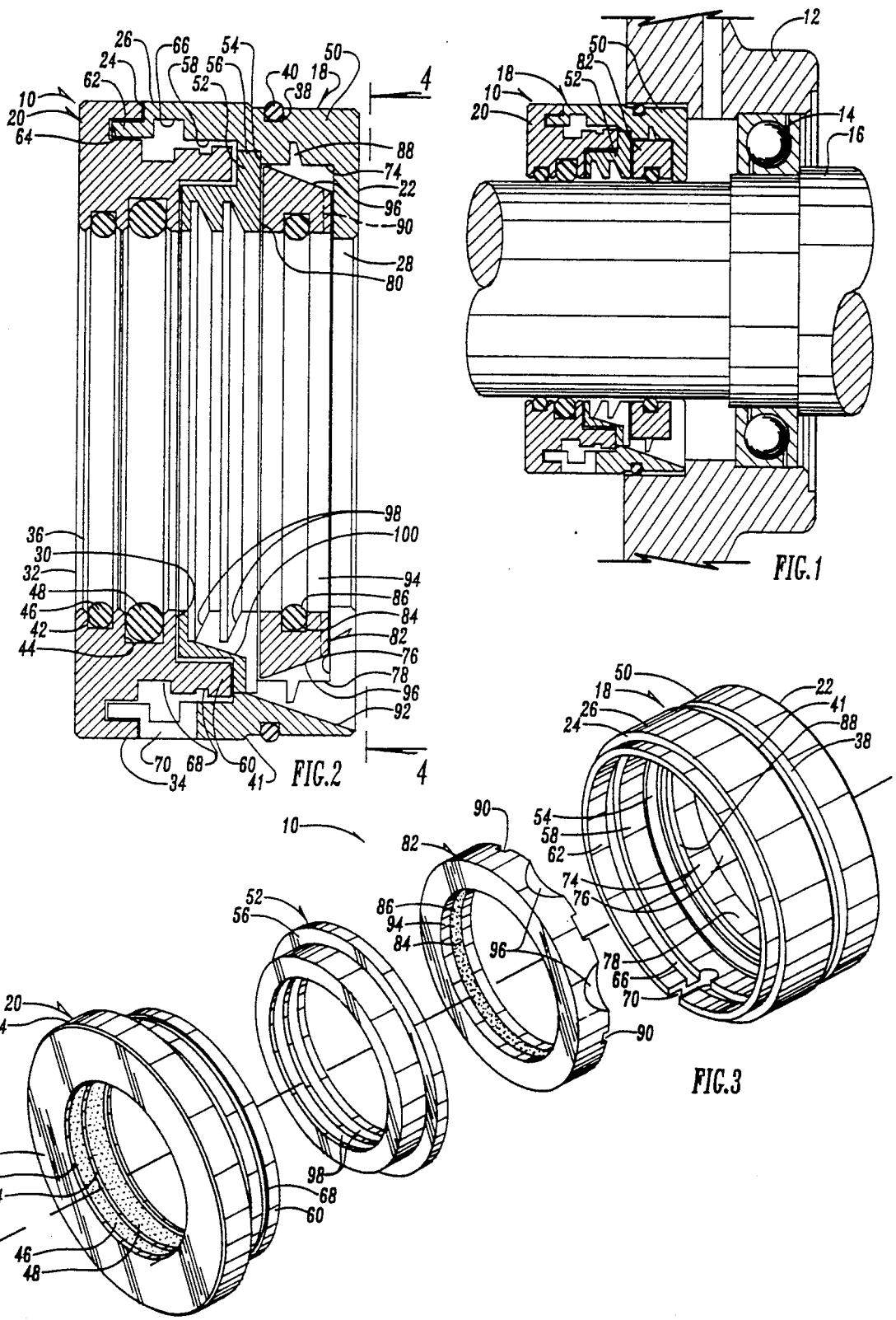

CAPTURED ROTOR SEAL

BACKGROUND OF THE INVENTION

Electric motors, gear boxes, and rolling mills are common work machines having a housing with a rotatable shaft for use in performing work. The shaft is normally journaled within a bearing mounted in the housing. The bearing and shaft are normally lubricated with oil, grease or the like.

The importance of maintaining the lubricating fluid within the housing and of preventing contaminants from entering the housing are well known. Loss of lubricant or contamination of the lubricant with foreign matter, including moisture, will cause premature bearing failure.

While lip and labyrinth seals are historically the primary type of seals used to retain the lubricant within the housing while withholding contaminates, more recently, improved seals have been developed which greatly improve the life of the bearing. For example, applicant's prior U.S. Pat. No. 4,022,479 discloses a seal comprising a stator ring fixed to the housing and a rotor ring sealingly mounted on the shaft for rotation therewith. As described in the '479 patent, the stator has a series of labyrinth grooves for collecting any migrating lubricant, and has a trough or drain which returns lubricant from the groove to the housing sump. Contaminants entering the seal between the stator and rotor rings are collected in a channel or channels and expelled through a port to the exterior of the housing.

Applicant has improved and modified the basic sealing structure disclosed in the '479 patent, with such modifications being disclosed in U.S. Pat. No. 4,114,902, 4,175,752, 4,304,409, 4,466,620, 4,706,968 and 4,832,350.

Even with the improved labyrinth-type seals developed by applicant, problems of lubricant migration and welling exist in some environments, such as with sleeve bearing electric motors, gear boxes, and rolling mills, each of which present special sealing problems. Such migration and welling of the lubricant occur due to the high axial velocity at which the lubricant is impinged upon the bearing and shaft. These problems also exist, though to a lesser extent, when the bearing is ring-oiled. Also, the lubricant tends to migrate along the shaft and pass out of the housing due to the pressure differential caused by the air flow velocity, and the resulting energy, existing between the housing sump and the atmosphere.

For example, electric motors normally utilize air flow to cool the bearings and motor. However, such air flow creates a relative vacuum in the sump, and thus a pressure differential which may cause lubricant to leak out of the motor housing. Also, the shaft of an electric motor may shift axially between a mechanical center when the motor is at rest and a magnetic center when the motor is in operation. Such shifting of the shaft may displace the conventional seal or bearing isolator, thereby allowing further leakage of lubricants and/or lubricant contamination.

As another example, a gear box, or speed reduction gearing, has bearings which are subjected to a deluge of high velocity lubricant. The lubricant level within the sump often rises above the shaft OD, so as to overcome the gravity drainage system of lubricant back into the sump. Lubricant leakage is often present due to the excess lubricant. Also, oil lubrication used in gear boxes is often a foaming variety, which increases the volume and height above the shaft OD so as to cause further leakage.

A rolling mill is another example of a machine which may be subject to premature bearing failure. The rolls are changed or replaced frequently. As is often the case, the roll shaft seals may be damaged. Such shaft seal damage may allow kerosene or other lubricant used at the nip or contact point of the material to flow into and destroy the bearing at each end of the roll. Also, undesirable leakage of bearing lubricant onto the rolls may occur. This is particularly detrimental when the material being processed is food which then becomes contaminated.

The seal of the present invention, while useful on most work machines that use rotating shafts, is especially designed to meet the specific problems of electric motors, gear boxes and rolling mills.

One primary objective of the invention is the development of an improved seal which may be used to overcome the problems discussed above with regard to electric motors, gear boxes and rolling mills.

Another primary objective of the present invention is the provision of an improved seal to overcome migration and welling problems in equipment having lubricated rotating shafts.

Another objective of the present invention is the provision of an improved seal which exerts energy on the lubricant entering the seal so as to counter the energy resulting from the internal and external pressure differential and the impingement velocity of the lubricant.

Still another objective of the present invention is the provision of a sealing structure having a captured rotor that is mounted within the stator so as to prevent the axial and radial displacement of said rotor.

These and other objectives will become apparent from the description of the invention.

SUMMARY OF THE INVENTION

The seal of the present invention includes a stator ring fixed to the housing and a first rotor ring sealingly mounted on the shaft for rotation therewith. The stator and first rotor ring have a recess, and flange, which are complimentarily-shaped such that the flange is received within the recess with rotational clearance therebetween. A groove or channel is provided in the outer walls of the flange and recess so as to provide a cavity for the collection of entering contaminants, which are then expelled through an exit port.

A second rotor ring is rotatably captured within the stator ring and is sealingly mounted on the shaft for rotation therewith. The captured rotor includes radially extending slots on the inner face thereof for collecting migrating lubricant and impelling the collected lubricant, through centrifugal force, into an annular groove in the stator ring. The annular groove is in communication with a drainage trough such that the collected lubricant is forced back into the sump in counteraction to the pressure differential in electric motors or the welling lubricant in gear boxes.

BRIEF DESCRIPTION OF THE DRAWINGS

FIG. 1 is a sectional view showing the improved seal of the present invention as mounted on a shaft extending through a housing and the associated bearing.

FIG. 2 is an enlarged sectional view of the seal of the present invention.

FIG. 3 is an exploded perspective view of the seal of the present invention.

DETAILED DESCRIPTION OF THE INVENTION

Figure 4:
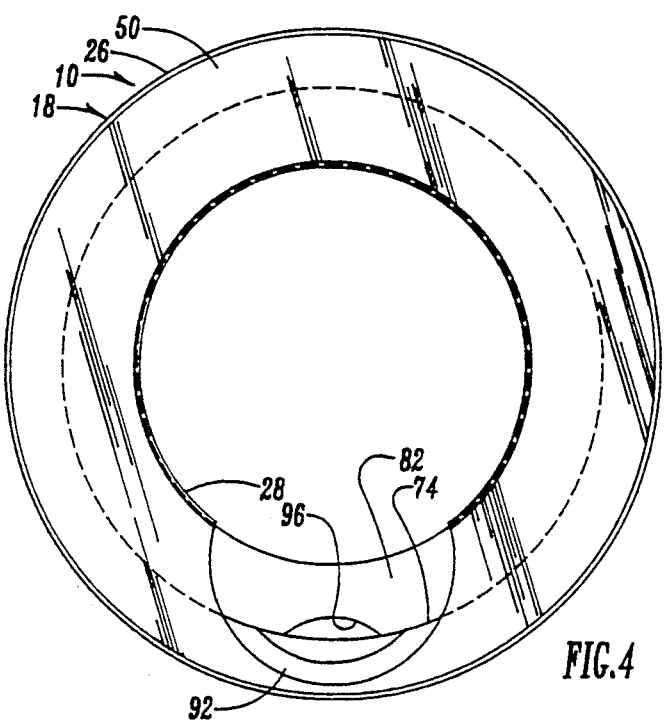
FIG. 4 is an end view of the seal of the present invention as seen along lines 4—4 of FIG. 2.
Figure 5:
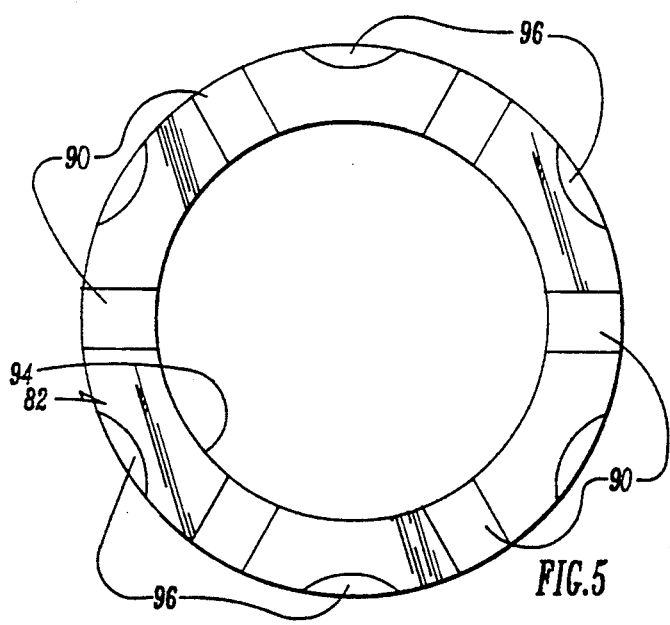
FIG. 5 is an end view of the captured rotor of the present invention.
Figure 6:
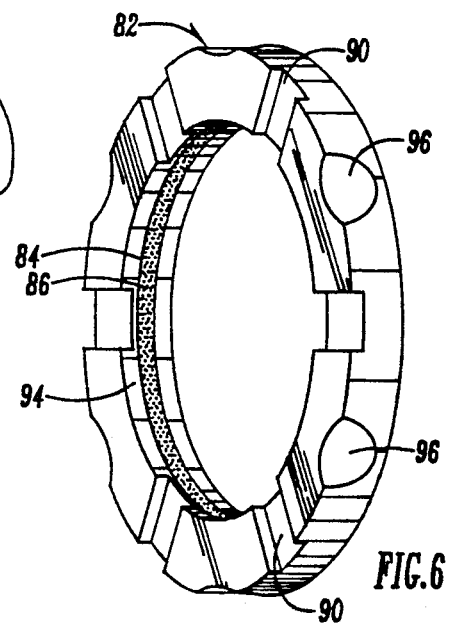
FIG. 6 is a perspective view of the captured rotor of the present invention.

The seal of the present invention is generally designated by the reference numeral 10 in the drawings. The figures show the seal mounted in a housing 12 having a bearing 14, with a rotatable shaft 16 extending therethrough.

Seal 10 includes a stator ring 18 and a first rotor ring 20. Stator 18 has opposite end faces 22, 24, an outer peripheral surface 26, and an inner peripheral surface 28. Similarly, rotor 20 has opposite end faces 30, 32, an outer peripheral surface 34, and an inner peripheral surface 36.

Stator 18 has an annular groove 38 on the outer peripheral surface 26 in which an O-ring 40 is mounted for a frictional, gasketed fit within housing 12, as seen in FIG. 1. A ramped shoulder 41 is also provided on outer peripheral surface 26 of stator 18 so as to limit the inward axially movement of stator 18 as it is mounted into housing 12. Rotor 20 has a pair of annular grooves 42, 44 on the inner peripheral surface 36, in which are mounted O-rings 46, 48, respectively, which provide a sealing and frictional fit of rotor 20 on shaft 16, as seen in FIG. 1. Rotor 20 will thus rotate with shaft 16. The preferred width of grooves 42, 44 are 0.103" and 0.139", respectively, and the grooves have respective depths of 0.080" and 0.112". O-rings 46, 48 have preferred diameters of 0.103" and 0.139" so as to be matingly received within grooves 42, 44 respectively. The clearance between rotor 20 and shaft 16 is approximately 0.007". Thus, there is a resulting 0.020" radial crush of the O-rings 46, 48 at the shaft-to-drive-ring fit.

Stator ring 18 is comprised of a primary section 50 and a secondary section 52, as best seen in FIG. 3. Primary section 50 includes an internal shoulder 54. Secondary section 52 includes a radially extending flange 56 which is press fitted into shoulder 54, as seen in FIG. 2.

Together, primary section 50 secondary section 52 form an axially extending annular groove 58 in stator ring 18. Rotor ring 20 has a corresponding axially extending annular flange 60 which is received within groove 58. Clearance is provided between groove 58 and flange 60, as seen in FIG. 2. A preferred and recommended clearance is 0.005-0.015 inch on each side of flange 60. Stator ring 18 also has an axially extending flange 62 which is received, with clearance, in an axially extending annular groove 64 in rotor 20, as best seen in FIG. 2.

Also formed in the inner peripheral surface 28 of stator 18 is a radially extending annular groove 66. Axially flange 60 on rotor 20 also has at least one, and preferably two, annular grooves 68 extending radially inwardly. Grooves 66 and 68 form channels in which contaminants from the exterior of housing 20 accumulate. An exit port 70 is provided in stator 18 so that such contaminates can be expelled or gravitated from seal 10.

Stator 18 has a radially extending annular channel 74 formed by sidewall 76 and a bottom wall 78 on primary ring section 50 and an end face 80 on secondary ring section 52.

Rotatably mounted within channel 74 is a captured rotor ring 82. Captured rotor 82 has an annular groove 84 on its inner peripheral surface in which is mounted an O-ring 86 such that rotor 82 is sealingly and frictionally mounted on shaft 16, as seen in FIG. 1. O-ring 86 has sufficient contact with shaft 16 to create a seal, while still permitting the shaft to shift axially between its mechanical and magnetic centers. The width of groove 84 and the diameter of O-ring 86 are substantially equal, with a preferable dimension of 0.103". As with rotor 20, rotor 82 has a clearance with shaft 16 of approximately 0.007". The depth of groove 84 is sufficient to create an approximate 0.007" crush of O-ring 86 on shaft 16 so as to allow axial shift of the shaft. A clearance is provided between captured rotor 82 and groove 74 in stator 18 so that rotor 82 is free to rotate with shaft 16.

In addition to minimizing the leakage or migration of lubricant outwardly along shaft 16 due to O-ring 86, captured rotor 82 also imparts energy to any migrating and welling lubricant so as to prevent such migration and eliminate outward flow of lubricant due to such welling. More particularly, stator ring 18 has at least one annular groove 88 extending radially outwardly from channel 74. Rotor 82 has a plurality of radially extending slots 90 on the inner end thereof Any lubricant which enters the clearance between rotor 82 and channel 74 along sidewalls 76 is scraped and collected by slots 90 which then impart centrifugal energy to such lubricant in the form of increased velocity so as to force the leaking lubricant into groove 88. A return trough 92 is formed in the inner peripheral surface 28 of stator 18 and is in communication with groove 88 so that the lubricant which is forced into groove 88 from slots 90 can drain and vector back into the housing sump. Furthermore, the inner end of slots 90 adjacent the inner peripheral surface 94 of captured rotor 82 also tend to scrape welling lubricant from the surface of shaft 16 and direct the scraped lubricant into groove 88 for return to the housing sump via trough 92.

As an alternative to, or an addition to slots 90, captured rotor 82 may have a plurality of scalloped recesses 96 which also impart energy to migrating lubricant due to centrifugal force to force the lubricant into groove 88 and ultimately back into the housing through return trough 92.

Secondary section 52 of stator 18 also has annular grooves 98 extending radially outwardly from inner peripheral surface thereof. These grooves 98 capture any remaining lubricant passing beyond the junction of section 52 of stator 18 and captured rotor 82. A trough 100 communicates with grooves 98 and with trough 92, as seen in FIG. 2, so as to return the lubricant retained in grooves 98 to the housing sump.

In operation, seal 10 is mounted on the machine, such as an electric motor, gear box or rolling mill, with stator ring 18 mounted within the housing 12, with O-ring 40 providing a seal therebetween, as best seen in FIG. 1 of the drawings. The primary rotor 20 and the captured rotor 82 are sealingly mounted on shaft 16 by the respective O-rings 44, 46, 86 for rotation with the shaft of the machine. The chamber formed by the groove 66 in stator ring 18 and groove 68 formed in rotor ring 20 define a cavity for collection of contaminants entering between the clearance on the mating end faces of the stator ring and rotor ring. Such collected contaminants are then expelled through port 70 by gravity.

The slots 90 collect lubrication which is migrating outwardly along shaft 16 due to, for example, the pressure differentials in electric motors and welling in gear boxes. The centrifugal force created by the rotating ring 82 in conjunction with slots 90 and scalloped recesses 96, impels the migrating lubrication radially outwardly into annular groove 88 in stator ring 18. The force imparted to the collected lubricant is sufficient to force the lubricant through trough 92 and back into the sump, in counteraction to the pressure differential in electric motors and the welling in gear boxes. In other words, the force imparted to the migrating lubricant by rotor 82 is greater than the force causing the migration, such that the lubricant is, in effect, pumped back into the housing sump.

Any migrating lubricant which passes beyond slots 90, and ring 86 in captured rotor 82 is collected in annular grooves 98 in the secondary section 52 of stator ring 18. Grooves 98 are also in communication with trough 92 via trough 100. Accordingly, the lubricant collected in grooves 98 drains through trough 100 and into trough 92 wherein the excess energy in the lubricant collected and impelled by the captured rotor 82 is transmitted to the lubricant coming from grooves 98 such that the latter lubricant will be forced back into the sump.

In operation, stator ring 18 is mounted in housing 12 concentrically about shaft 16. The first rotor ring 20 is sealingly mounted upon shaft 16 for rotation therewith and such that the flange 60 of rotor 20 is received within the groove 58 of stator ring 18. Groove 66 in the stator ring and groove 68 in the rotor 20 form a channel in which contaminants entering the clearance between the stator and rotor are collected. Such collected contaminants are expelled through export port 70.

As lubricant within the housing sump migrates outwardly along shaft 16 due to pressure differential and/or welling the slots 90 in captured rotor 82 collect such migrating lubricant. Through centrifugal force of the rotating rotor 82, the slots 90 and recesses 96 impel the lubricant into groove 88 in stator ring 18. The collected lubricant is then forced back into the housing sump through trough 92. Any migrating lubricant which passes beyond rotor 82 is collected in grooves 98 in the secondary portion 52 of the stator ring. The lubricant drains from grooves 98 through trough 100 and into trough 92 where energy from the rotating rotor 82 forces the lubricant back into the housing sump. Thus, migrating lubricant is energized by the captured rotor 82 and forced back into the sump in counteraction to any pressure differential or welling which exists within the housing.

Also, when used with electric motors that may have axial displacement of the shaft between the mechanical and magnetic centers, rotor 82 is captured within the stator 18 between walls 76 and 80. Accordingly, rotor 82 is not displaced axially, as is rotor 20, during axial shift of the electric motor shaft. Accordingly, the integrity of the seal 10 is maintained so as to prevent leakage of lubricants.

The captured rotor 82 can also be utilized in the One-Piece Labyrinth Seal disclosed in applicant's prior U.S. Pat. No. 4,832,350, issued on May 23, 1989, which disclosure is incorporated herein by reference. In such a modified seal, the stator would be formed of two sections, as described above, with the internal or captured rotor rotatably mounted within the stator ahead of the enlarged collection chamber. The captured rotor in such a modified one-piece labyrinth seal would function in the same manner as described above so as to force lubricant back into the housing sump or contaminants away from the bearing housing.

It is to be understood that the dimensions of the various structural elements of the seal are all relative and therefore the dimensions provided in this specification are not critical, but only preferred dimensions.

From the foregoing, it can be seen that the present invention accomplishes at least all of the stated objectives.

I claim:

1. A seal between a fixed housing and a rotating shaft, comprising:

a stator ring fixed to the housing concentrically about the shaft and having opposite end faces, an exterior peripheral surface and an interior peripheral surface;

a rotor ring sealingly mounted on the shaft for rotation therewith, and having opposite end faces, an exterior peripheral surface and an interior peripheral surface;

one of the rings having an annular groove extending axially from one end face intermediate the exterior and interior peripheral surfaces;

the other of said rings having an annular flange extending axially from one end face intermediate the exterior and interior peripheral surfaces and being received within the axially extending annular groove;

the stator ring further having an annular groove extending radially from the interior peripheral surface; and a third ring sealingly mounted on the shaft for rotation therewith, and being rotatably received within the radially extending groove of the stator ring.

2. The seal of claim 1 wherein the stator ring further includes a passageway extending between the radially extending groove and the end face opposite the axially extending groove so that lubricant entering the radially extending groove is returned to the interior of the housing.

3. The seal of claim 2 wherein the third ring includes means for imparting energy to the lubricant entering the radially extending groove.

4. The seal of claim 3 wherein the third ring has opposite end faces, an interior peripheral surface and an exterior peripheral surface, and the means for imparting energy includes at least one radially extending slot in the third ring extending radially between the interior and exterior peripheral surfaces.

5. The seal of claim 3 wherein the third ring has opposite end faces, an interior peripheral surface and an exterior peripheral surface, and the means for imparting energy includes at least one scalloped recess in one end face of the third ring, the recess extending to the exterior peripheral surface of the third ring.

6. The seal of claim 1 wherein the radially extending groove in the stator ring is defined by a radially extending side wall formed in the stator ring, an axially extending wall formed in the stator ring, and a radially extending side wall formed on a fourth ring, the fourth ring being fixed within the stator ring after the third ring is positioned adjacent the first side wall of the stator ring.

7. The seal of claim 6 wherein the fourth ring has an interior peripheral surface with at least one radially extending annular groove, and a passageway extending between the groove in the fourth ring and the radially extending groove of the stator ring.

8. The seal of claim 7 wherein the stator ring further includes a passageway extending between the radially extending groove to the end face opposite the axially extending groove so that lubricant entering the radially extending groove is returned to the interior of the housing. groove of the stator ring.

9. The seal of claim 1 wherein the stator ring has an annular channel extending radially from the annular groove for collecting oil migrating along the shaft.

10. The seal of claim 1 further including a channel formed in one of the stator ring or rotor ring for collecting contaminates entering the seal, and a port extending from the channel to the exterior of the housing to expel contaminates from the channel.

11. The seal of claim 1 wherein the groove has opposite side walls and a bottom wall extending axially between the side walls, the third ring being closely spaced to the side walls and bottom wall of the groove.

12. A seal between a fixed housing and a rotating shaft, comprising:
  a stator ring fixed to the housing with a central opening through which the shaft rotatably extends and having opposite end faces;
  a first rotor ring adjacent the stator ring and being sealingly mounted on the shaft for rotation therewith;
  a second rotor ring rotatingly mounted within the stator ring between the end faces thereof and sealingly mounted on the shaft for rotation therewith; and
  one of the stator or first rotor rings having an axially extending annual groove and the other having an axially extending annular flange received within the annular grove.

13. The seal of claim 12 further including a port for expelling contaminants which enter the seal between the stator ring and first rotor ring.

14. The seal of claim 12 further comprising a channel in the stator ring for collecting oil migrating outwardly along the shaft.

15. The seal of claim 14 further comprising a passageway in the stator ring communicating with the channel and the interior of the housing for returning lubricant to the interior of the housing from the channel.

16. The seal of claim 15 wherein the second rotor ring includes means for imparting energy to lubricant migrating along the shaft so that such lubricant is forced back into a sump within the housing.

17. The seal of claim 16 wherein the means for imparting energy includes at least one slot in the second rotor ring extending radially to the passageway.

18. The seal of claim 16 wherein the means for imparting energy includes a recess in the second rotor ring extending to the passageway.

19. A seal between a fixed housing and a rotating shaft, comprising:
  a stator ring fixed to the housing with a central opening through which the shaft rotatably extends and having opposite end faces;
  a first rotor ring adjacent the stator ring and being sealingly mounted on the shaft for rotation therewith;
  a second rotor ring rotatingly mounted within the stator ring between the end faces thereof and sealingly mounted on the shaft for rotation therewith;
  a channel in the stator ring for collecting oil migrating outwardly along the shaft; and
  a passageway in the stator ring communicating with the channel and the interior of the housing for returning lubricant to the interior of the housing form the channel.

20. The seal of claim 19 wherein the second rotor ring includes means for imparting energy to lubricant migrating along the shaft so that such lubricant is forced back into a sump within the housing.

21. The seal of claim 19 wherein the means for imparting energy includes at least one slot in the second rotor ring extending radially to the passageway.

22. The seal of claim 19 wherein the means for imparting energy includes a recess in the second rotor ring extending to the passageway.

* * * * *